Dec. 24, 1946.  V. R. TINSLER ET AL  2,413,266

GUARD MECHANISM

Filed Dec. 29, 1944

INVENTOR.

BY

Patented Dec. 24, 1946

2,413,266

UNITED STATES PATENT OFFICE 2,413,266

GUARD MECHANISM

Vernon R. Tinsler and Harold L. Brock, Detroit, Mich., assignors to Ford Motor Company, Dearborn, Mich., a corporation of Delaware Application December 29, 1944, Serial No. 570,293

7 Claims. (Cl. 74—612)

This invention relates to tractor mechanism; and, more particularly, to a safety device having particular application in agricutural tractors having one or more power takeoffs.

It is usual in agricultural tractors to provide a power takeoff shaft—usually terminating at the rear of the tractor and adapted for connection through an auxiliary shaft and a universal joint to combines, mowers and like implements which require a secondary operating force in addition to that supplied by the tractor draft. This power takeoff shaft is driven by the tractor engine and the exposed end is usually splined to permit engagement with the auxiliary shaft. In addition, these tractors are often equipped with a belt pulley also driven from the engine and used, while the tractor is stationary, to operate saws, mills or the like.

The exposed end of the takeoff shaft is usually in such a position that some shielding should be provided to prevent accidental contact with it. This is even more important when the universal joint is attached, as this element will readily snag the operator's clothing and may cause serious injury since it is rotating at considerable speed.

It is, therefore, an object of this invention to provide a safety device to shield the power takeoff shaft with or without a universal joint attached. Another object is to provide a shield of such conformation that it will not interfere with the free movement of the auxiliary shaft when attached under various conditions and variations of draft. Let another object is to provide a shield which though ample to cover both universal joint and power takeoff, may be restricted to the takeoff shaft alone to permit clearance for operation of the belt pulley. Still another object is to provide a shield which is automatic in operation and which will insure protection at all times both for the tractor operator or others who may be working around the tractor.

Each of these objects is attained in the device of this invention. The shield shown will, in one position, cover the power takeoff and attached universal joint while permitting the auxiliary shaft the necessary range of movement. In another position, it provides a secondary cover for the power takeoff shaft alone and povides clearance for operation of the belt pulley. The transfer from one position to the other, as may be required by different operating conditions, is expeditious and the protection is certain.

With these and other objects in view, the invention consists in the arrangement, construction and combination of the various parts of the improved device, as described in the specification, claimed in the claims, and shown in the accompanying drawing, in which:

Figure 1:
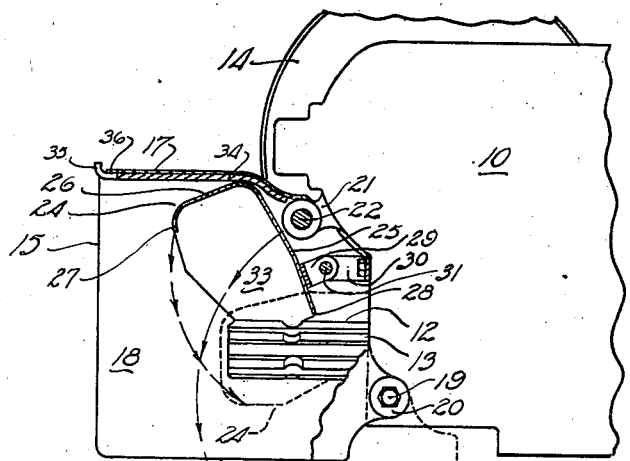
Figure 1 is a side elevation of the extreme rear end of a tractor having the safety device thereon and sectioned as indicated by the line 1—1 of Figure 2. The figure further shows the device in position for normal operation in full line and the alternate position in dotted line.
Figure 3:
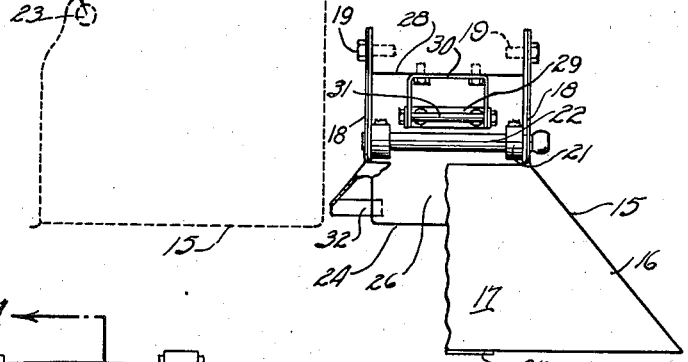
Figure 3 is a plan view of the shield, a portion of the major shield being broken away to show the secondary shield, both being in the normal position.
Figure 2:
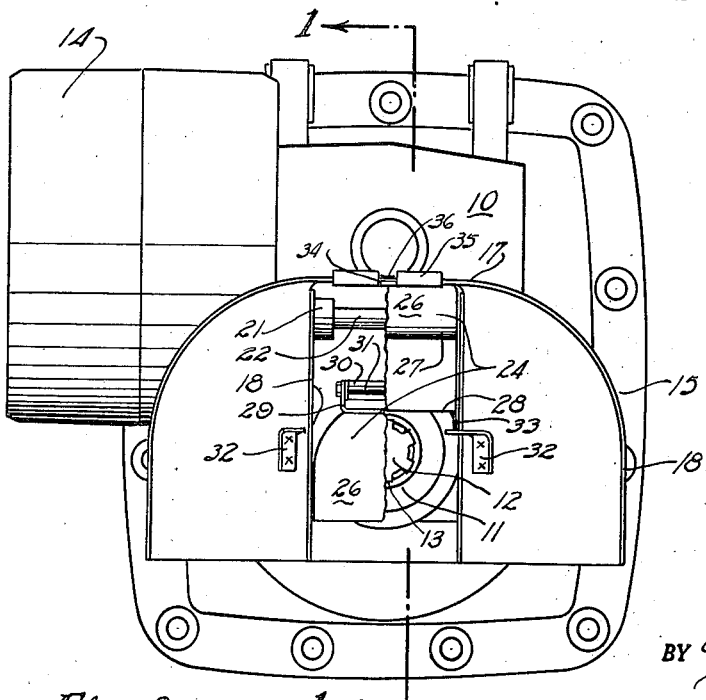
Figure 2 is a rear elevation corresponding to that of Figure 1. In this view the major shield is shown as for normal operation, while the secondary shield on the right side of the drawing is in normal position and on the left side is shown in the alternate position.

Referring to Figures 1 and 2, 10 indicates the rear portion of a tractor frame of the Ford type in which this element is substantially tubular and extends rearwardly from the engine enclosing the transmission and differential, and providing a direct support for the vehicle's axle. Journaled in the bearing 11 and projecting rearwardly therefrom is the power takeoff shaft 12, which is splined at 13 for engagement with auxiliary drive means. On one side of the frame 10 is mounted a belt pulley 14. The preferred drive for the shaft 12 and pulley 14 is described in the copending application of Brock et al., entitled Power takeoff drive unit, S. N. 570,292, filed of even date herewith. The major shield 15 is generally hood-shaped and comprises an outer flared portion 16, having a top 17 and terminates inwardly in two spaced vertical side members 18. The shield 15 is open over the entire bottom and on top between the side members 18 which lie on opposite sides of the frame 10 and are pivotally attached to it by the bolts 19, passing through the ears 20 on each side member. A reinforcing plate 34 underlies the top 17 and flares upwardly at 35 at the outer edge. Both plate 34 and top 17 are slotted at 36 to provide an attaching means for auxiliary protective tunnels, which can be pivotally attached thereto by a bolt whose shank fits in the slot and whose head is retained behind the flare. A pair of trunnions 21 are formed integrally with the frame 10, one on each side of the longitudinal center line and the major shield 15 is normally held in the position shown in full line in Figure 1 by a removable pin 22, which passes through the trunnions 21 and apertures 23 in the side members 18.

The secondary shield is substantially scoop-shaped with a closed top 25 and end 26 and an inwardly extending lip 27. The shield opens downwardly and inwardly up to the inner edge 28. A U-shaped bracket 29 is spot-welded to the upper surface of the shield 24 and a second U-shaped bracket 30 is bolted to the frame 10 below the trunnions 21. These brackets 29 and 30 are pivoted on a pin 31, which serves as a hinge for the secondary shield 24. A pair of ears 32 are spot-welded to the interior of the flared portion 16 (as best seen in Figure 2) and extend inwardly therefrom far enough to intercept the sides 33 of the secondary shield 24. A coil spring may be placed on the pin 31 resiliently urging the shield 24 downwardly.

In normal operation (with or without an auxiliary shaft) the major shield 15 occupies the position shown in Figure 2 and is held there by the pin 22. In this position the ears 32 engage the sides 33 of the secondary shield 24 and hold it in the position shown in Figure 1 or the right part of Figure 2, so that it is clear of the takeoff shaft 12 and any auxiliary shaft or universal joint that may be applied thereto.

However, when belt operation is desired, it is obvious that the pulley 14 is obstructed by the shield 15. In this circumstance, the pin 22 is withdrawn and the major shield 15 pivoting around the bolts 19 falls to the position shown in dotted line in Figure 1. This movement withdraws the support given the shield 24 by the ears 32 and it in turn pivots about the pin 31 to the position shown in dotted line in Figure 1 and to the left in Figure 2 until its inner edge 28 abuts the frame 10. In this position it safely encloses the shaft 12 and clearance is provided for belt operation. Thus, in the normal raised position the large or main shield 15 is adequate to permit the use of any conventional universal joint and to allow for any changes in the direction of draft that may be encountered while the small or secondary shield 24 is automatically held out of the way by said main shield. When belt operation is desired (there being no need for allowance for a universal joint or for draft variations) the large shield 15 can be dropped down and the small shield 24 automatically assumes a position to furnish adequate protection for the shaft 12.

Some changes may be made in the arrangement, construction and combination of the various parts of the improved device, without departing from the spirit of the invention, and it is the intention to cover by the claims such changes as may reasonably be included within the scope thereof.

The invention claimed is:

1. A safety device for a power takeoff shaft having one end thereof extending beyond a housing, comprising: a hood-shaped shell having closed sides and a closed top, and openings at the front and rear ends, said shell having its rear end disposed beyond the end of said shaft and having its front end adapted to be swingably mounted on said housing, releasable means to secure said shell in one position of adjustment with said shaft enclosed by said sides and top and with said front and rear openings aligned with said shaft, said shell being swingable therefrom to another position remote from said one position, a secondary hood swingably mounted within said shell, and means engaging said secondary hood when said shell is in said one position and securing said secondary hood at a position remote from said shaft, said secondary hood being swingable when said shell is in said other position to a position enclosing said shaft.

2. In a safety device for tractors having a power takeoff shaft, a shell having closed sides and a closed top and openings at the front and rear ends, said shell being pivoted on said tractor and so arranged that in one position thereof said front and rear openings are aligned with said shaft, and said shaft is enclosed by said top and sides and said top and sides substantially abut said tractor, releasable means to secure said shell in said one position, a smaller shell pivoted on said tractor above said shaft, means on said first shell securing said second shell in a position remote from said shaft when said first shell is in said one position and permitting said smaller shell to enclose said shaft on operation of said releasable means.

3. In a safety device for a tractor having a frame and a power takeoff shaft, a shell having outwardly flared sides connected by a top member, said sides terminating in forwardly extending spaced ears, said ears being pivotally attached to said frame beneath said shaft, releasable means to secure said shell with said top above said shaft and said sides substantially abutting said frame and enclosing said shaft, a smaller shell pivoted to said frame within said first shell above said shaft and swingable downwardly to cover said shaft, and means on said first shell normally engaging said second shell and securing said second shell above said shaft, said first shell being swingable downwardly on operation of said releasable means freeing said smaller shell to enclose said shaft.

4. The structure of claim 3 which is further characterized in that the rearward end of said first shell is open and the rearward end of said smaller shell is closed.

5. In a safety device for a tractor having a frame, a power takeoff shaft at the end thereof and a belt pulley on one side thereof, a guard shell for said shaft having outwardly flared sides connected by a top member and terminating in forwardly extending spaced ears, said ears being pivotally attached to said tractor frame beneath said shaft, releasable means normally securing said shell in a raised position with said top above said shaft and said sides substantially abutting said frame enclosing said shaft and at least one of said flared sides interfering with the reach of a belt from said belt pulley, a smaller shell pivoted to said frame within said first shell above said shaft and swingable downwardly to cover said shaft, said guard shell being swingable downwardly on operation of said releasable means to a lowered position beneath said belt pulley.

6. The structure of claim 5 which is further characterized in that engaging means are provided between said two shells holding said smaller shell clear of said shaft when said guard shell is in normal raised position and permitting said smaller shell to enclose said shaft when said guard shell is positioned beneath said belt pulley.

7. The structure of claim 5 which is further characterized in that engaging means are provided between said two shells effective to hold said smaller shell clear of said shaft when said guard shell is in normal raised position and permitting said smaller shell to substantially enclose said shaft when said guard shell is positioned beneath said belt pulley, the outer end of said guard shell being open and the outer end of said smaller shell being closed.

VERNON R. TINSLER.
HAROLD L. BROCK.